(12) United States Patent
Chen et al.

(10) Patent No.: US 10,737,885 B1
(45) Date of Patent: Aug. 11, 2020

(54) AUTOMATIC COMPENSATION, BALANCING AND TENSIONING CONVEYING CHAIN

(71) Applicant: CITIC Dicastal Co., Ltd., Qinhuangdao (CN)

(72) Inventors: Lin Chen, Qinhuangdao (CN); Jie Lyu, Qinhuangdao (CN); Hongqing Xu, Qinhuangdao (CN); Wenming He, Qinhuangdao (CN); Kebin Wang, Qinhuangdao (CN); Jinyong Hao, Qinhuangdao (CN); Jianpeng Ning, Qinhuangdao (CN); Zhiying Ma, Qinhuangdao (CN)

(73) Assignee: CITIC Dicastal Co., Ltd., Qinhuangdao (CN)

( * ) Notice: Subject to any disclaimer, the term of this patent is extended or adjusted under 35 U.S.C. 154(b) by 0 days.

(21) Appl. No.: 16/666,354

(22) Filed: Oct. 28, 2019

(30) Foreign Application Priority Data

Jun. 6, 2019 (CN) .......................... 2019 1 04903166

(51) Int. Cl.
| | | |
|---|---|---|
| *B65G 23/44* | (2006.01) | |
| *B65G 43/02* | (2006.01) | |
| *B65G 43/06* | (2006.01) | |
| *B65G 21/20* | (2006.01) | |
| *B65G 17/28* | (2006.01) | |
| *B65G 17/12* | (2006.01) | |
| *B65G 21/14* | (2006.01) | |
| *B65G 21/22* | (2006.01) | |

(52) U.S. Cl.
CPC ............. *B65G 23/44* (2013.01); *B65G 17/12* (2013.01); *B65G 17/28* (2013.01); *B65G 21/14* (2013.01); *B65G 21/20* (2013.01); *B65G 21/22* (2013.01); *B65G 43/02* (2013.01); *B65G 43/06* (2013.01)

(58) Field of Classification Search
CPC ........ B65G 17/12; B65G 17/28; B65G 21/14; B65G 21/20; B65G 21/22; B65G 23/44; B65G 43/02; B65G 43/06
See application file for complete search history.

(56) References Cited

U.S. PATENT DOCUMENTS

| | | | |
|---|---|---|---|
| 3,638,781 A * | 2/1972 | Comley | B65G 23/44 198/810.04 |
| 10,159,999 B2 * | 12/2018 | Ma | B05B 13/0431 |
| 10,518,979 B2 * | 12/2019 | Takeuchi | B65G 17/12 |
| 2019/0322459 A1* | 10/2019 | Lurie | B65G 23/44 |

* cited by examiner

*Primary Examiner* — Gene O Crawford
*Assistant Examiner* — Keith R Campbell
(74) *Attorney, Agent, or Firm* — IPro, PLLC; Qian Gu

(57) ABSTRACT

Provided is an automatic compensation, balancing and tensioning conveying chain wherein the conveying chain can automatically adjust the guide rails to extend and retract and be automatically tensioned and balanced to avoid the influence on the conveying efficiency of the conveying chain due to the slack of the conveying chain. In addition, the guide rail position maintaining components provide a reverse compensation force to the telescopic guide rail when the guide rail pre-warning limiting switches are triggered, so as to reduce the imbalance of movements of the sliding trolleys and avoid a situation that the sliding trolley may trigger an extreme position signal in advance to cause a false alarm and stop the entire conveying chain, thereby guaranteeing a dynamic balance of two tensioning stations and completely eliminating an elasticity change of the chain.

11 Claims, 2 Drawing Sheets

AUTOMATIC COMPENSATION, BALANCING AND TENSIONING CONVEYING CHAIN

FIELD

The present disclosure relates to the technical field of conveying apparatuses, and in particular, to an automatic compensation, balancing and tensioning conveying chain.

BACKGROUND

A coating conveying chain is widely used in assembly line conveying equipment. It is non-standard equipment. A customer can customize it according to process requirements. A chain production line mainly consists of three parts: a conveying frame serving as a main body portion, a chain serving as a conveying carrier, and a power plant for providing power to operation of the equipment. With the advancement of science and technology and industrial production, a conveying chain technology has achieved rapid development in various fields such as wheel hubs and auto parts. In an actual production process of the wheel hubs, since the sizes and weights of on-site produced wheel types are varied, a load of a chain of a spray coating line dynamically changes with the switching of the wheel types. With the accumulation of years of production, the conveying chain will extend in different degrees. In addition, when the load of the conveying chain changes, especially when the weight of the load increases, the conveying chain is pressed and sunken, which may cause slack of the conveying chain or even folds on the chain and thus affect the conveying smoothness of the conveying chain, and may even cause serious problems such as jamming and breakage of the conveying chain and stop the entire conveying chain. Therefore, it is necessary to design a conveying apparatus to solve the negative impact on the conveying chain due to the extending of the conveying chain and a change in the load on the conveying chain.

SUMMARY

An embodiment of the present disclosure provides an automatic compensation, balancing and tensioning conveying chain, which can solve the technical problems in the background. By arrangement of a telescopic guide rail and counterweight tensioning components, the conveying chain can automatically adjust the guide rails to extend and retract and be automatically tensioned and balanced to avoid the influence on the conveying efficiency of the conveying chain due to the slack of the conveying chain. In addition, by the arrangement of guide rail pre-warning limiting switches and guide rail position maintaining components, such a situation is avoided that when the load on the conveying chain changes, a sliding trolley at a near end of a driving station and a sliding trolley at a far end of the driving station have a relatively large difference in movement, and then the sliding trolley at the near end or the far end of the driving station may trigger an extreme position signal in advance to sound a false alarm to make the entire conveying chain stop and then halve a function of tensioning to adjust the change of the chain by the two counterweight components. Therefore, the guide rail position maintaining components can provide a compensation force to the telescopic guide rail to reduce the imbalance of the movements of the sliding trolleys, thereby thoroughly avoiding the false alarm caused by the change of the load, guaranteeing a dynamic balance of two tensioning stations and completely eliminating an elasticity change of the chain.

In order to achieve the above objectives, the present disclosure provides the following technical solutions.

On one aspect, a conveying apparatus is provided, comprising a driving station, a conveying chain, a sliding bracket, a telescopic guide rail, sliding trolleys, trolley sliding rails, counterweight tensioning components and guide rail alarming limiting switches, wherein the driving station provides a driving force; the conveying chain is arranged in the telescopic guide rail; the sliding bracket is arranged on the conveying chain; the sliding bracket is used to support a to-be-conveyed object; the driving station drives the conveying chain to move towards a conveying direction; the conveying chain drives the sliding bracket and the to-be-conveyed object on the sliding bracket to move towards the conveying direction; two sliding trolleys and two trolley sliding rails are comprised; one sliding trolley corresponds to one trolley sliding rail; the sliding trolleys may slide on the corresponding trolley sliding rails; the telescopic guide rail is arranged horizontally; the telescopic guide rail comprises two U-shaped bent rails, fixed sleeve rails and middle connection rails; the two U-shaped bent rails are respectively fixed on the two sliding trolleys; the movements of the U-shaped bent rails may drive the sliding trolleys to slide along the trolley sliding rails; the trolley sliding rails are parallel to the fixed sleeve rails and the middle connection rails; the middle connection rails are laid between the driving station and one end of the U-shaped bent rail at a near end of the driving station, between the other end of the U-shaped bent rail at the near end of the driving station and one end of the U-shaped bent rail at a far end of the driving station, and at the other end of the U-shaped bent rail at the far end of the driving station; furthermore, two ends of each U-shaped bent rail are respectively inserted into one end of each of two fixed sleeve rails, and the middle connection rails are inserted into the other ends of the fixed sleeve rails; the fixed sleeve rails connect the middle connection rails with the two U-shaped bent rails into a continuous rail; the middle connection rails and the U-shaped bent rails may slide in the fixed sleeve rails under the action of an external force; two counterweight tensioning components are comprised, which are respectively fixed at the U-shaped bottoms of the two U-shaped bent rails; the counterweight tensioning components always provide an outward pulling force to the U-shaped bent rails; when the telescopic guide rail and the conveying chain are pressed to be sunken by the to-be-conveyed object, and the counterweight tensioning components provide the outward pulling force to pull the U-shaped bent rails to the outside, so that the telescopic guide rail and the conveying chain are tensioned; after the to-be-conveyed object leaves the telescopic guide rail, the telescopic guide rail and the conveying chain are recovered to be horizontal; the conveying chain pulls the U-shaped bent rails to the inside and drives the counterweight tensioning components to be reset to original positions; two guide rail alarming limiting switches are comprised, which are respectively located on the two trolley sliding rails; the guide rail alarming limiting switches constrain an extreme position where the telescopic guide rail may move; the counterweight tensioning components pull the U-shaped bent rails to move and drive the sliding trolleys to slide along the trolley sliding rails; the sliding trolleys trigger the guide rail alarming limiting switches, and the driving station stops working, so that the entire conveying apparatus is stopped. The two counterweight tensioning components are arranged in this embodiment, and are respectively located at two ends of the telescopic guide rail. When the telescopic guide rail or the conveying chain stretches or slacks, the telescopic guide rail or the conveying chain may be automatically balanced and tensioned under the action of pulling forces, towards the outside, of the counterweight tensioning components at the two ends, so as to solve the negative impact on the conveying chain due to the extending of the conveying chain and a change in a load on the conveying chain and to avoid the influence on the conveying efficiency of the conveying chain due to the slack of the conveying chain.

In some embodiments, wherein the conveying apparatus further comprises a guide rail pre-warning limiting switch and a guide rail position maintaining component; the guide rail pre-warning limiting switch is located on the trolley sliding rail at the near end of the driving station and in front of the guide rail alarming limiting switch; the guide rail position maintaining component is arranged on the outer side of the sliding trolley at the near end of the driving station and used to apply an inward acting force to the sliding trolley or the U-shaped bent rail within certain time when the sliding trolley moves to the outside and triggers the guide rail pre-warning limiting switch, so that the sliding trolley or the U-shaped bent rail does not move to the outside any more; and after the to-be-conveyed object is transmitted to the telescopic guide rail at the far end of the driving station and the sliding trolley moves to the inside away from the guide rail pre-warning limiting switch to make the entire conveying apparatus tensioned to achieve a dynamic balance, the acting force is not applied. In this embodiment, the guide rail pre-warning limiting switch is only arranged on a trolley sliding rail at the near end of the driving station, and the guide rail position maintaining component is only arranged on the outer side of the sliding trolley. The guide rail position maintaining component provides a reverse compensation force to the telescopic guide rail at the near end within certain time when the guide rail pre-warning limiting switch at the near end of the driving station is triggered, so as to reduce the imbalance of the movements of the sliding trolleys and avoid such a situation that when the load of the conveying chain changes, the sliding trolley at the near end close to the driving station is pulled by the counterweight component to move to the outside by a relatively large movement, and at this time, the second counterweight component at the far end far from the driving station pulls the sliding trolley to move by a relatively small movement, so that a large moving distance of the sliding trolley at the near end may trigger the guide rail alarming limiting switch in advance to cause a false alarm to stop the conveying chain and then halve a function of tensioning to adjust the change of the chain by the two counterweight components. This embodiment can solve the false alarm at the near end, guarantee the dynamic balance of the two tensioning stations and completely eliminate the elasticity change of the chain.

In some embodiments, comprising two guide rail pre-warning limiting switches and two guide rail position maintaining components, wherein the two guide rail pre-warning limiting switches are respectively located on the two trolley sliding rails, and are both located in front of the guide rail alarming limiting switches on the respective trolley sliding rails and triggered earlier than the guide rail alarming limiting switches on the respective trolley sliding rails; the two guide rail position maintaining components are respectively located on the outer sides of the two sliding trolleys and used to apply an inward acting force to the sliding trolleys or the U-shaped bent rails within certain time when the sliding trolleys on the corresponding sides move to the outside and trigger the guide rail pre-warning limiting switches, so that the sliding trolleys or the U-shaped bent rails do not move to the outside any more; and after the to-be-conveyed object is conveyed away and the sliding trolleys move to the inside away from the guide rail pre-warning limiting switches to tension the entire conveying apparatus to realize a dynamic balance, the acting force is not applied. In this embodiment, both the near end and the far end of the driving station are provided with the guide rail pre-warning limiting switches and the guide rail position maintaining components. The guide rail position maintaining components provide reverse compensation forces to the telescopic guide rail within certain time when the guide rail pre-warning limiting switches are triggered, so as to reduce the imbalance of the movements of the sliding trolleys and avoid such a situation that when the load of the conveying chain changes, the sliding trolley at the near end of the driving station and the sliding trolley at the far end of the driving station have a relatively large difference in movement, and the sliding trolley at the near end or the far end of the driving station may trigger an extreme position signal in advance to sound a false alarm to make the entire conveying chain stop and then halve a function of tensioning to adjust the change of the chain by the two counterweight components, thereby avoiding the false alarm caused by the triggering of the guide rail alarming limiting switch due to a large moving distance of the sliding trolley at the near end or the far end of the driving station, guaranteeing the dynamic balance of the two tensioning stations and completely eliminating the elasticity change of the chain.

In some embodiments, wherein the guide rail position maintaining components comprise compensation cylinders, in-cylinder position signal switches, cylinder electromagnetic valves and pressure reducing valves; the cylinders are provided with magnetic rings; the magnetic rings are arranged on pistons; the cylinder electromagnetic valves control extended states and retracted states of the cylinders; the in-cylinder position signal switches are magnetic switches; the in-cylinder position signal switches are arranged on the outer sides of the cylinders and used to limit extending limits of piston rods of the compensation cylinders; the piston rods of the compensation cylinders extend out, and then the magnetic rings on the pistons move to the in-cylinder position signal switches to trigger the in-cylinder position signal switches to generate signals to the cylinder electromagnetic valves; the cylinder electromagnetic valves control the cylinders to change from the extended states to the retracted states; air inlets of the cylinder electromagnetic valves are connected with the pressure reducing valves; and compressed air enters the air inlets of the cylinder electromagnetic valves through the pressure reducing valves. A compensation cylinder, an in-cylinder position signal switch and a cylinder electromagnetic valve in this embodiment form simple cylinder working control. The principle is simple, a complicated control unit circuit design is eliminated, and the cost is reduced.

Further, wherein the positions of the guide rail pre-warning limiting switches on the two trolley sliding rails are adjustable. In this embodiment, the position of the guide rail pre-warning limiting switch is adjustable, so that a distance between the guide rail pre-warning limiting switch and the guide rail alarming limiting switch may be determined according to an actual requirement, and frequent actions of the compensation cylinder in special cases may be avoided, and the adaptability and the adjustability of the cylinder are improved.

In some embodiments, wherein a guide rail bracket is arranged below the telescopic guide rail; the guide rail bracket is used to support the telescopic guide rail and the trolley sliding rails; the U-shaped bottom of each U-shaped bent rail is connected with one counterweight tensioning component; the counterweight tensioning component comprises a counterweight heavy, a counterweight bracket, a steel wire rope and a pulley component; the counterweight bracket comprises a vertical portion and a horizontal portion; the top end of the vertical portion is connected with the horizontal portion; the pulley component comprises two fixed pulleys located at the bottom and the top end of the vertical portion of the counterweight bracket, a fixed pulley located at the end, away from the vertical portion, of the horizontal portion of the counterweight bracket, a fixed pulley fixed in the middle of the U-shaped bottom of the U-shaped bent rail, and a fixed pulley located in the middle of the bottom surface of the end, provided with the U-shaped bent rail, on the guide rail bracket; one end of the steel wire rope is fixed in the middle of the top surface of the end, provided with the U-shaped bent rail, on the guide rail bracket; the steel wire rope bypasses the fixed pulley fixed in the middle of the U-shaped bottom of the U-shaped bent rail, the fixed pulley in the middle of the bottom surface of the end, provided with the U-shaped bent rail, on the guide rail bracket, the two fixed pulleys at the bottom and the top end of the vertical portion of the counterweight bracket and the fixed pulley at the end, away from the vertical portion, of the horizontal portion of the counterweight bracket in sequence; and the other end of the steel wire rope is fixedly connected to the counterweight heavy. In the above embodiment, the pulley components are used to arrange the counterweight components between the telescopic guide rail, and outward pulling forces are provided to the U-shaped bent rails, thereby saving the space.

In some embodiments, wherein a guide rail bracket is arranged below the telescopic guide rail; the guide rail bracket is used to support the telescopic guide rail and the trolley sliding rails; the U-shaped bottom of each U-shaped bent rail is connected with one counterweight tensioning component; the counterweight tensioning component comprises a counterweight heavy, a counterweight bracket, a steel wire rope and a pulley component; the counterweight bracket comprises a vertical portion and a horizontal portion; the top end of the vertical portion is connected with the horizontal portion; the pulley component comprises two fixed pulleys located at the bottom and the top end of the vertical portion of the counterweight bracket, a fixed pulley located at the end, away from the vertical portion, of the horizontal portion of the counterweight bracket, and a fixed pulley located in the middle of the bottom surface of the end, provided with the U-shaped bent rail, on the guide rail bracket; one end of the steel wire rope is fixed at the middle position of the U-shaped bottom of the U-shaped bent rail; the steel wire rope bypasses the fixed pulley in the middle of the bottom surface of the end, provided with the U-shaped bent rail, on the guide rail bracket, the two fixed pulleys at the bottom and the top end of the vertical portion of the counterweight bracket and the fixed pulley at the end, away from the vertical portion, of the horizontal portion of the counterweight bracket in sequence; and the other end of the steel wire rope is fixedly connected to the counterweight heavy. In the above embodiment, the pulley components are used to arrange the counterweight components between the telescopic guide rail, and outward pulling forces are provided to the U-shaped bent rails, thereby saving the space.

In addition, one fixed pulley is removed in each pulley component, so that the structure is more precise and lower in cost.

In some embodiments, wherein the telescopic guide rail is of a double-layer structure, and the U-shaped bent rails, the fixed sleeve rails and the middle connection rails are all of double-layer structures; a lower layer of telescopic guide rail comprises two side walls and a bottom surface, and the conveying chain is arranged on the bottom surface of the lower layer of telescopic guide rail; and an upper layer of telescopic guide rail comprises two side walls. In this embodiment, the double-layer design of the telescopic guide rail guarantees the stability of the sliding bracket for conveying to-be-conveyed objects, and the double-layer design makes the entire conveying chain more stable.

In some embodiments, wherein the sliding bracket comprises a bottom sliding block, a supporting rod, sliding rollers and a top supporting portion; the bottom sliding block is arranged on the conveying chain of the lower layer of telescopic guide rail; the conveying chain may drive the bottom sliding block to move; the lower end of the supporting rod is connected with the bottom sliding block, and the upper end of the supporting rod is connected with the top supporting portion; the top supporting portion is used for placing a to-be-conveyed object; the supporting rod passes through a space between the two side walls of the upper layer of telescopic guide rail; the sliding rollers corresponding to the upper layer of telescopic guide rail are arranged on the supporting rod; and the sliding rollers slide between the two side walls of the upper layer of telescopic guide rail. In this embodiment, on one hand, due to the design of the sliding brackets, the to-be-conveyed objects are conveyed on the telescopic guide rail more stably with a small shake possibility and conveying smoothness; and on the other hand, the whole apparatus is smaller in size, occupies a smaller space and makes processing or spray coating more convenient.

Compared with the prior art, the present disclosure has the beneficial effects that:

by the arrangement of the telescopic guide rail and the counterweight tensioning components, the conveying apparatus provided by the present disclosure can automatically adjust the guide rails to extend and retract and be automatically tensioned and balanced to avoid the influence on the conveying efficiency of the conveying chain due to the slack of the conveying chain. In addition, by the arrangement of the guide rail pre-warning limiting switches and the guide rail position maintaining components, the guide rail position maintaining components provide the reverse compensation force to the telescopic guide rail within certain time when the guide rail pre-warning limiting switches are triggered, so as to reduce the imbalance of the movements of the sliding trolleys and avoid such a situation that when the load on the conveying chain changes, the sliding trolley at the near end of the driving station and the sliding trolley at the far end of the driving station have the relatively large difference in movement, and then the sliding trolley at the near end or the far end of the driving station may trigger the extreme position signal in advance to sound the false alarm to make the entire conveying chain stop and then halve the function of tensioning to adjust the change of the chain by the two counterweight components. Therefore, the false alarm caused by the change of the load is thoroughly avoided, the dynamic balance of the two tensioning stations is guaranteed, and the elasticity change of the chain is completely eliminated.

BRIEF DESCRIPTION OF THE DRAWINGS

In order to more clearly explain the technical solution in the embodiments of the application, drawings which require to be used in description of the embodiments are simply introduced below, obviously, the drawings in description below are some embodiments of the application, and those having ordinary skill in the art can further acquire other drawings without creative efforts according to those drawings.

Figure 1:
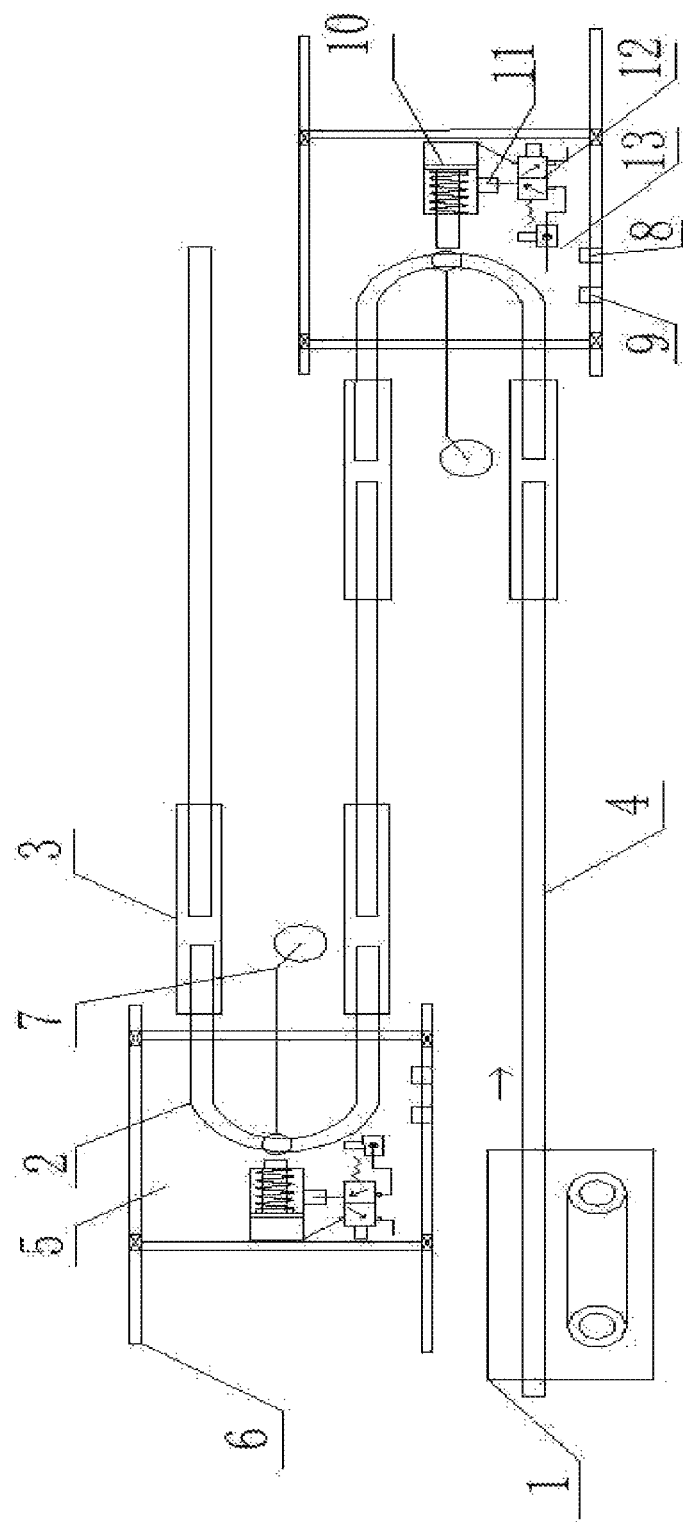
FIG. 1 is a structural schematic diagram of an automatic compensation, balancing and tensioning conveying chain of the present disclosure.

In the drawings: 1: driving station; 2: U-shaped bent rail; 3: fixed sleeve rail; 4: middle connection rail; 5: sliding trolley; 6: trolley sliding rail; 7: counterweight tensioning component; 8: guide rail alarming limiting switch; 9: guide rail pre-warning limiting switch; 10: compensation cylinder; 11: in-cylinder position signal switch; 12: cylinder electromagnetic valve; 13: pressure reducing valve; 14: guide rail bracket; 15: counterweight heavy; 16: steel wire rope; 17: pulley component; 18: counterweight bracket; 19: bottom sliding block; 20: supporting rod; 21: sliding roller; 22: top supporting portion; 23: upper layer of telescopic guide rail; and 24: lower layer of telescopic guide rail.

DETAILED DESCRIPTION OF THE EMBODIMENTS

The technical solution in the embodiments of the application is clearly and completely described in combination with drawings of the embodiments of the application below, and obviously, the described embodiments are part of embodiments of the application rather than all embodiments. Based on the embodiments of the application, all the other embodiments obtained by those having ordinary skill in the art without any creative works are within the protection scope of the application.

The terms 'first', 'second', 'third', 'fourth' and the like in the specification and in the claims of the application are used for distinguishing different objects but not for describing a specific sequence. Furthermore, the terms 'comprise' and 'have' as well as their any variations are intended to cover a non-exclusive inclusion. For example, a process, method, system, product or equipment comprising a series of steps or units does not limit steps or units which have been listed, but selectively further comprises steps or units which are not listed, or selectively further comprises other inherent steps or units for the process, method, product or equipment.

Reference in the specification to 'embodiments' of the application means that a particular feature, structure or characteristic described in connection with the embodiments is included in at least one embodiment of the application. The appearances of the phrase 'the embodiments' in various places in the specification are not necessarily all referring to the same embodiment, nor are separate or alternative embodiments necessarily mutually exclusive of other embodiments. It will be explicitly and implicitly understood by those skilled in the art that the embodiments described in the application can be combined to other embodiments.

In order to further understand the content, features and functions of the disclosure, the following embodiments are given and illustrated with the attached drawings as follows.

Embodiment 1

Figure 2:
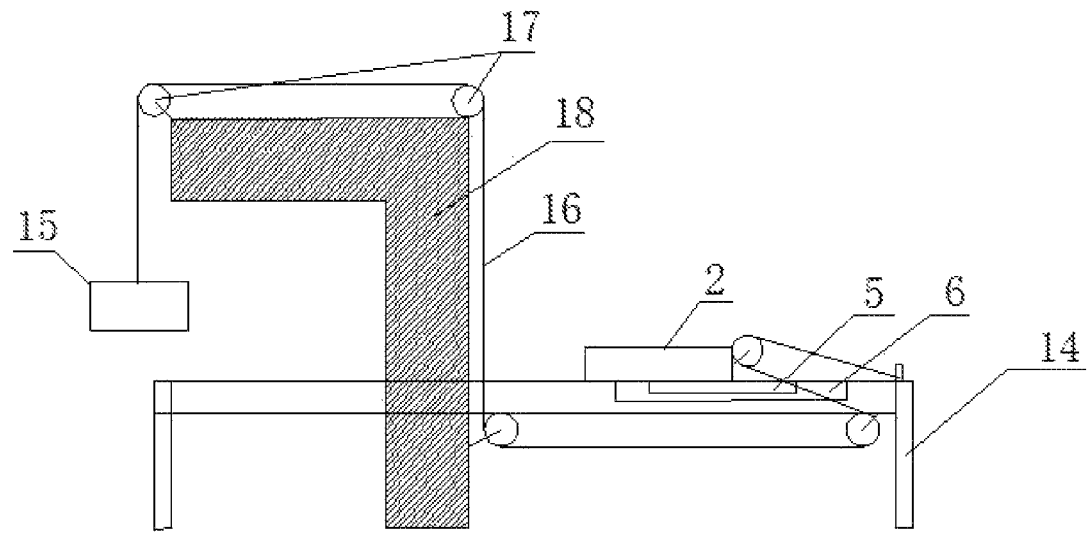
FIG. 2 is a structural schematic diagram of a counterweight tensioning component of an automatic compensation, balancing and tensioning conveying chain of the present disclosure.
Figure 3:
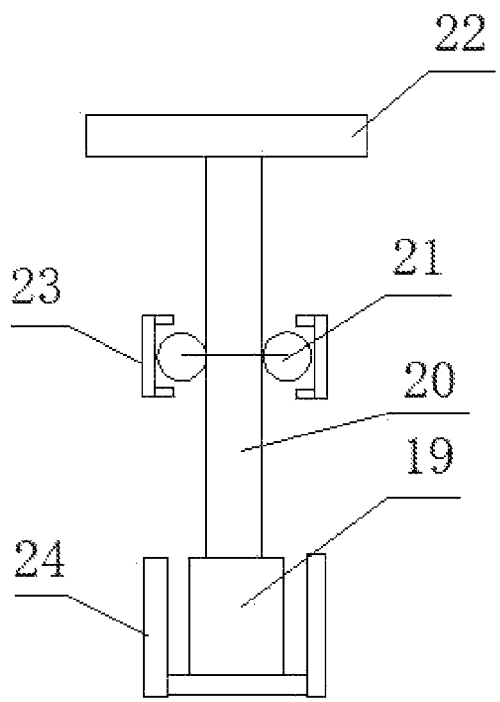
FIG. 3 is a structural schematic diagram of a sliding bracket and a telescopic guide rail of an automatic compensation, balancing and tensioning conveying chain of the present disclosure.

Embodiment 1 of the present disclosure is described below in conjunction with FIGS. 1 to 3. An automatic compensation, balancing and tensioning conveying chain includes a driving station 1, a conveying chain, a sliding bracket, a telescopic guide rail, sliding trolleys 5, trolley sliding rails 6, counterweight tensioning components 7, guide rail alarming limiting switches 8, guide rail pre-warning limiting switches 9 and guide rail position maintaining components. The driving station 1 provides a driving force to drive a conveying direction of the conveying chain. The conveying chain is arranged in the telescopic guide rail. The sliding bracket is arranged on the conveying chain. The sliding bracket is used to support a to-be-conveyed object. The driving station 1 drives the conveying chain to move towards the conveying direction. The conveying chain drives the sliding bracket and the to-be-conveyed object on the sliding bracket to move towards the conveying direction.

Two sliding trolleys 5 and two trolley sliding rails 6 are included. One sliding trolley 5 corresponds to one trolley sliding rail 6. The sliding trolleys 5 may slide on the corresponding trolley sliding rails 6. The telescopic guide rail is arranged horizontally. The telescopic guide rail includes two U-shaped bent rails 2, fixed sleeve rails 3 and middle connection rails 4. The two U-shaped bent rails 2 are respectively fixed on the two sliding trolleys 5. The movements of the U-shaped bent rails 2 may drive the sliding trolleys 5 to slide along the trolley sliding rails 6. The trolley sliding rails 6 are parallel to the fixed sleeve rails 3 and the middle connection rails 4. The middle connection rails 4 are laid between the driving station 1 and one end of the U-shaped bent rail 2 at a near end of the driving station 1, between the other end of the U-shaped bent rail 2 at the near end of the driving station 1 and one end of the U-shaped bent rail 2 at a far end of the driving station 1, and at the other end of the U-shaped bent rail 2 at the far end of the driving station 1. Furthermore, two ends of each U-shaped bent rail 2 are respectively inserted into one end of each of the two fixed sleeve rails 3, and the middle connection rails 4 are inserted into the other ends of the fixed sleeve rails 3. The fixed sleeve rails 3 connect the middle connection rails 4 with the two U-shaped bent rails 2 into a continuous rail. The middle connection rails 4 and the U-shaped bent rails 2 may slide in the fixed sleeve rails 3 under the action of an external force. The telescopic guide rail is of a double-layer structure, and the U-shaped bent rails 2, the fixed sleeve rails 3 and the middle connection rails 4 are all of double-layer structures. A lower layer of telescopic guide rail 24 includes two side walls and a bottom surface, and the conveying chain is arranged on the bottom surface of the lower layer of telescopic guide rail 24. An upper layer of telescopic guide rail 23 includes two side walls. The sliding bracket includes a bottom sliding block 19, a supporting rod 20, sliding rollers 21 and a top supporting portion 22. The bottom sliding block 19 is arranged on the conveying chain of the lower layer of telescopic guide rail 24. The conveying chain may drive the bottom sliding block 19 to move. The lower end of the supporting rod 20 is connected with the bottom sliding block 19, and the upper end of the supporting rod 20 is connected with the top supporting portion 22. The top supporting portion 22 is used for placing a to-be-conveyed object. The supporting rod 20 passes through a space between the two side walls of the upper layer of telescopic guide rail 23. The sliding rollers 21 corresponding to the upper layer of telescopic guide rail 23 are arranged on the supporting rod 20. The sliding rollers 21 slide between the two side sides of the upper layer of telescopic guide rail 23.

Two counterweight tensioning components 7 are included, which are respectively fixed at the U-shaped bottoms of the two U-shaped bent rails 2. The counterweight tensioning components 7 always provide an outward pulling force to the U-shaped bent rails 2. When the telescopic guide rail and the conveying chain are pressed to be sunken by the to-be-conveyed object, and the counterweight tensioning components 7 provide the outward pulling force to pull the U-shaped bent rails 2 to move to the outside, so that the telescopic guide rail and the conveying chain are tensioned. After the to-be-conveyed object leaves the telescopic guide rail, the telescopic guide rail and the conveying chain are recovered to be horizontal. The conveying chain pulls the U-shaped bent rails 2 to the inside and drives the counterweight tensioning components 7 to be reset to original positions. A guide rail bracket 14 is arranged below the telescopic guide rail. The guide rail bracket 14 is used to support the telescopic guide rail and the trolley sliding rails 6. The U-shaped bottom of each U-shaped bent rail 2 is connected with one counterweight tensioning component 7. The counterweight tensioning component 7 includes a counterweight heavy 15, a counterweight bracket 18, a steel wire rope 16 and a pulley component 17. The counterweight bracket 18 includes a vertical portion and a horizontal portion. The top end of the vertical portion is connected with the horizontal portion. The pulley component 17 includes two fixed pulleys located at the bottom and the top end of the vertical portion of the counterweight bracket 18, a fixed pulley located at the end, away from the vertical portion, of the horizontal portion of the counterweight bracket 18, a fixed pulley fixed in the middle of the U-shaped bottom of the U-shaped bent rail 2, and a fixed pulley located in the middle of the bottom surface of the end, provided with the U-shaped bent rail 2, on the guide rail bracket 14. One end of the steel wire rope 16 is fixed in the middle of the top surface of the end, provided with the U-shaped bent rail 2, on the guide rail bracket 14. The steel wire rope 16 bypasses the fixed pulley fixed in the middle of the U-shaped bottom of the U-shaped bent rail 2, the fixed pulley in the middle of the bottom surface of the end, provided with the U-shaped bent rail 2, on the guide rail bracket 14, the two fixed pulleys at the bottom and the top end of the vertical portion of the counterweight bracket 18 and the fixed pulley at the end, away from the vertical portion, of the horizontal portion of the counterweight bracket 18 in sequence. The other end of the steel wire rope 16 is fixedly connected to the counterweight heavy 15.

Two guide rail alarming limiting switches 8 are included, which are respectively located on the two trolley sliding rails 6 and are fastened on the trolley sliding rails 6 through bolts. The guide rail alarming limiting switches 8 constrain an extreme position where the telescopic guide rail may move. The counterweight tensioning components 7 pull the U-shaped bent rails 2 to move and drive the sliding trolleys 5 to slide along the trolley sliding rails 6. The sliding trolleys 5 trigger the guide rail alarming limiting switches 8, and the driving station 1 stops working, so that an entire conveying apparatus is stopped.

Two guide rail pre-warning limiting switches 9 and two guide rail position maintaining components are included.

The two guide rail pre-warning limiting switches 9 are respectively located on the two trolley sliding rails 6 and are both located in front of the guide rail alarming limiting switches 8 on the respective trolley sliding rails 6, and are triggered earlier than the guide rail alarming limiting switches 8 on the respective trolley sliding rails 6. For example, the guide rail pre-warning limiting switches 9 may be mounted at positions that are 2 to 4 cm in front of the guide rail alarming limiting switches 8. The positions of the guide rail pre-warning limiting switches 9 on the two trolley sliding rails 6 may be adjusted, so that distances between the guide rail pre-warning limiting switches 9 and the guide rail alarming limiting switches 8 may be determined according to an actual requirement. Furthermore, a trigger delay may be set in the guide rail pre-warning limiting switches 9, preferably 5 to 10 s, which may avoid frequent actions of compensation cylinders 10 in special cases, thus improving the adaptability and the adjustability of the cylinders.

The two guide rail position maintaining components are respectively located on the outer sides of the two sliding trolleys 5 and fixed on the guide rail bracket 14 to apply an inward acting force to the sliding trolleys 5 or the U-shaped bent rails 2 within certain time when the sliding trolleys 5 on the corresponding sides move to the outside and trigger the guide rail pre-warning limiting switches 9, so that the sliding trolleys 5 or the U-shaped bent rails 2 do not move to the outside any more. After the to-be-conveyed object is conveyed away and the sliding trolleys 5 move to the inside away from the guide rail pre-warning limiting switches 9 to tension the entire conveying apparatus to realize a dynamic balance, the acting force is not applied. The guide rail position maintaining components include the compensation cylinders 10, in-cylinder position signal switches 11, cylinder electromagnetic valves 12 and pressure reducing valves 13. The compensation cylinders 10 are provided with magnetic rings. The magnetic rings are arranged on pistons. The compensation cylinders 10 are fixed on the guide rail bracket 14 on the outer sides of the sliding trolleys 5 through cylinder bases and bolts. Piston rods of the compensation cylinders 10 are opposite to the middles of the U-shaped bottoms of the U-shaped bent rails 2. The guide rail pre-warning limiting switches 9 provide enabling signals to the compensation cylinders 10 of the guide rail position maintaining components. The cylinder electromagnetic valves 12 control extended states and retracted states of the cylinders. The in-cylinder position signal switches 11 are magnetic switches. The in-cylinder position signal switches 11 are arranged on the outer sides of the cylinders and used to limit extending limits of the piston rods of the compensation cylinders 10. The piston rods of the compensation cylinders 10 extend out, and then the magnetic rings on the pistons move to the in-cylinder position signal switches 11 to trigger the in-cylinder position signal switches 11 to generate signals to the cylinder electromagnetic valves 12. The cylinder electromagnetic valves 12 control the cylinders to change from the extended states to the retracted states. Air inlets of the cylinder electromagnetic valves 12 are connected with the pressure reducing valves 13. Compressed air enters the air inlets of the cylinder electromagnetic valves 12 through the pressure reducing valves. The pressure of the pressure reducing valves 13 may be preferably adjustable from 0.5 to 6 bars to guarantee the continuous adjustability of the pressure of the compensation cylinders 10. The cylinder electromagnetic valves 12 and the pressure reducing valves 13 are mounted on the cylinder bases through a plurality of bolts to jointly control the telescopic actions of the compensation cylinders 10. In this embodiment, the compensation cylinders 10 use cylinders having diameters of 40 mm and provide a pushing force of 10 to 60 kg to the conveying chain. Each compensation cylinder 10 may be selected as a single-acting cylinder, and includes one air inlet. Each cylinder electromagnetic valve 12 may be selected as a two-position three-way electromagnetic valve having one valve ring. The guide rail pre-warning limiting switches 9 and the in-cylinder position signal switches 11 are connected with the cylinder electromagnetic valves 12 in a signal manner. The cylinder electromagnetic valves 12 include air inlets, air outlets and exhaust ports. A compressed air pipeline is connected with the air inlets of the cylinder electromagnetic valves 12 through the pressure reducing valves 13. The air outlets of the cylinder electromagnetic valves 12 are connected with the air inlets of the compensation cylinders 10 through pipelines. The exhaust ports of the cylinder electromagnetic valves 12 communicate with the outside. The compensation cylinders 10 and the pressure reducing valves 13 cooperate with the counterweight tensioning components 7 to guarantee the dynamic balance of the tensioned conveying chain and prevent the driving station 1 from being stopped.

The near end and the far end of the driving station 1 in this embodiment are determined from the driving station 1 along a conveying distance of the conveying chain. The near end is close to the driving station 1, and the far end is away from the driving station 1.

During actual use, the conveying chain moves towards a driving direction of the driving station 1. Under a normal condition, when a load on the conveying chain changes, the telescopic guide rail may dynamically extend and retract with the change of the load. The U-shaped bent rails 2 of the telescopic guide rail drive the sliding trolleys 5 to move on the trolley sliding rails 6 towards the guide rail pre-warning limiting switches 9. At this time, the response speed of the U-shaped bend at the near end of the driving station 1 is higher than that of the U-shaped bend at the far end, so that the U-shaped bent rail 2 of the U-shaped bend at the near end may move towards the guide rail pre-warning limiting switch 9 and the guide rail alarming limiting switch 8 and has a large moving distance. At this time, if the load is in an extremely imbalanced state at one moment, namely if the U-shaped bent rail 2 at the near end of the driving station 1 drives the sliding trolley 5 to move on trolley sliding rail 6 at a large distance, and the U-shaped bent rail 2 at the far end of the driving station 1 drives the sliding trolley 5 to move on the trolley sliding rail 6 at a very small distance, it is very easy for the sliding trolley 5 driven by the U-shaped bent rail 2 at the near end of the driving station 1 to trigger the guide rail pre-warning limiting switch 9, resulting in line stop caused by a false alarm, so that one guide rail pre-warning limiting switch 9 is added, which is 2 to 4 cm away from the front end of the guide rail alarming limiting switch 8. When the sliding trolley 5 at the near end is driven to trigger the guide rail pre-warning limiting switch 9 for continuous 10 s or longer time, the cylinder electromagnetic valve 12 acquires an enabling signal to push out the piston rod of the compensation cylinder 10, and at this time, the compensation cylinder 10 provides a counteractive force to the telescopic guide rail and the sliding trolley 5 to transmit the load to the telescopic guide rail and the sliding trolley 5 at the far end till the entire conveying chain is tensioned to realize the dynamic balance. When the compensation cylinder 10 is pushed out to the in-cylinder position signal switch 11, the compensation cylinder 10 changes from the extended state to the retracted state. At this time, the telescopic guide rail and the sliding trolleys 5 at the near end and the far end may re-achieve a new tensioned dynamic balance with the load of the conveying chain and the counterweight tensioning components at the two ends, thereby avoiding the false alarm caused by an instant imbalanced load of the conveying chain.

Embodiment 2: a difference between Embodiment 2 and Embodiment 1 is that: a guide rail pre-warning limiting switch 9 and a guide rail position maintaining component are only arranged on one side of the near end of the driving station 1. Specifically, in Embodiment 2, the conveying apparatus further includes a guide rail pre-warning limiting switch 9 and a guide rail position maintaining component. The guide rail pre-warning limiting switch 9 is located on the trolley sliding rail 6 at the near end of the driving station 1 and in front of the guide rail alarming limiting switch 8. The guide rail position maintaining component is arranged on the outer side of the sliding trolley 5 at the near end of the driving station 1 and used to apply an inward acting force to the sliding trolley 5 or the U-shaped bent rail 2 within certain time when the sliding trolley 5 moves to the outside and triggers the guide rail pre-warning limiting switch 9, so that the sliding trolley 5 or the U-shaped bent rail 2 does not move to the outside any more. After the to-be-conveyed object is transmitted to the telescopic guide rail at the far end of the driving station 1 and the sliding trolley 5 moves to the inside away from the guide rail pre-warning limiting switch 9 to make the entire conveying apparatus tensioned to achieve the dynamic balance, the acting force is not applied. The rest of components and their connection relationships are the same as those in Embodiment 1.

Embodiment 3: a difference between Embodiment 3 and Embodiment 1 is the counterweight tensioning components 7 has a different structure. Specifically, in Embodiment 3, a guide rail bracket 14 is arranged below the telescopic guide rail. The guide rail bracket 14 is used to support the telescopic guide rail and the trolley sliding rails 6. The U-shaped bottom of each U-shaped bent rail 2 is connected with one counterweight tensioning component 7. The counterweight tensioning component 7 includes a counterweight heavy 15, a counterweight bracket 18, a steel wire rope 16 and a pulley component 17. The counterweight bracket 18 includes a vertical portion and a horizontal portion. The top end of the vertical portion is connected with the horizontal portion. The pulley component 17 includes two fixed pulleys located at the bottom and the top end of the vertical portion of the counterweight bracket 18, a fixed pulley located at the end, away from the vertical portion, of the horizontal portion of the counterweight bracket 18, and a fixed pulley located in the middle of the bottom surface of the end, provided with the U-shaped bent rail 2, on the guide rail bracket 14. One end of the steel wire rope 16 is fixed at the middle position of the U-shaped bottom of the U-shaped bent rail 2. The steel wire rope 16 bypasses the fixed pulley in the middle of the bottom surface of the end, provided with the U-shaped bent rail 2, on the guide rail bracket 14, the two fixed pulleys at the bottom and the top end of the vertical portion of the counterweight bracket 18 and the fixed pulley at the end, away from the vertical portion, of the horizontal portion of the counterweight bracket 18 in sequence. The other end of the steel wire rope 16 is fixedly connected to the counterweight heavy 15. In the above Embodiment 3, the pulley components 17 are used to arrange the counterweight components between the telescopic guide rail, and outward pulling forces are provided to the U-shaped bent rails 2, thereby saving the space. In addition, one fixed pulley is removed in each pulley component 17, so that the structure is more precise and lower in cost.

According to the above, the present disclosure provides the automatic compensation, balancing and tensioning conveying chain, including the driving station, the conveying chain, the sliding bracket, the telescopic guide rail, the sliding trolleys, the trolley sliding rails, the counterweight tensioning components, the guide rail alarming limiting switches, the guide rail pre-warning limiting switches and the guide rail position maintaining components. By the arrangement of the telescopic guide rail and the counterweight tensioning components, the conveying chain can automatically adjust the guide rails to extend and retract and be automatically tensioned and balanced to avoid the influence on the conveying efficiency of the conveying chain due to the slack of the conveying chain. In addition, by the arrangement of the guide rail pre-warning limiting switches and the guide rail position maintaining components, the guide rail position maintaining components provide a reverse compensation force to the telescopic guide rail within certain time when the guide rail pre-warning limiting switches are triggered, so as to reduce the imbalance of the movements of the sliding trolleys and avoid the situation that the sliding trolley at the near end or far end of the driving station may trigger an extreme position signal in advance to cause the false alarm and stop the entire conveying chain, thereby guaranteeing a dynamic balance of two tensioning stations and completely eliminating an elasticity change of the chain.

The embodiments of the application are described in detail above, particular examples are used herein to explain the principle and embodiments of the application, and the above description of the embodiments is only used to help understanding the methods and core concept of the application; and meanwhile, for those having ordinary skill in the art, according to the idea of the application, there will be changes in the specific implementation mode and application scope, in conclusion, the contents of the specification shall not be construed as a limitation of the application.

What is claimed is:

1. A conveying apparatus, comprising a driving station, a conveying chain, a sliding bracket, a telescopic guide rail, sliding trolleys, trolley sliding rails, counterweight tensioning components and guide rail alarming limiting switches, wherein the driving station provides a driving force; the conveying chain is arranged in the telescopic guide rail; the sliding bracket is arranged on the conveying chain; the sliding bracket is used to support a to-be-conveyed object; the driving station drives the conveying chain to move towards a conveying direction; the conveying chain drives the sliding bracket and the to-be-conveyed object on the sliding bracket to move towards the conveying direction;

two sliding trolleys and two trolley sliding rails are comprised; one sliding trolley corresponds to one trolley sliding rail; the sliding trolleys may slide on the corresponding trolley sliding rails; the telescopic guide rail is arranged horizontally; the telescopic guide rail comprises two U-shaped bent rails, fixed sleeve rails and middle connection rails; the two U-shaped bent rails are respectively fixed on the two sliding trolleys; the movements of the U-shaped bent rails may drive the sliding trolleys to slide along the trolley sliding rails; the trolley sliding rails are parallel to the fixed sleeve rails and the middle connection rails; the middle connection rails are laid between the driving station and one end of the U-shaped bent rail at a near end of the driving station, between the other end of the U-shaped bent rail at the near end of the driving station and one end of the U-shaped bent rail at a far end of the driving station, and at the other end of the U-shaped bent rail at the far end of the driving station; furthermore, two ends of each U-shaped bent rail are respectively inserted into one end of each of two fixed sleeve rails, and the middle connection rails are inserted into the other ends of the fixed sleeve rails; the fixed sleeve rails connect the middle connection rails with the two U-shaped bent rails into a continuous rail; the middle connection rails and the U-shaped bent rails may slide in the fixed sleeve rails under the action of an external force;

two counterweight tensioning components are comprised, which are respectively fixed at the U-shaped bottoms of the two U-shaped bent rails; the counterweight tensioning components always provide an outward pulling force to the U-shaped bent rails; when the telescopic guide rail and the conveying chain are pressed to be sunken by the to-be-conveyed object, and the counterweight tensioning components provide the outward pulling force to pull the U-shaped bent rails to the outside, so that the telescopic guide rail and the conveying chain are tensioned; after the to-be-conveyed object leaves the telescopic guide rail, the telescopic guide rail and the conveying chain are recovered to be horizontal; the conveying chain pulls the U-shaped bent rails to the inside and drives the counterweight tensioning components to be reset to original positions;

two guide rail alarming limiting switches are comprised, which are respectively located on the two trolley sliding rails; the guide rail alarming limiting switches constrain an extreme position where the telescopic guide rail may move; the counterweight tensioning components pull the U-shaped bent rails to move and drive the sliding trolleys to slide along the trolley sliding rails; the sliding trolleys trigger the guide rail alarming limiting switches, and the driving station stops working, so that the entire conveying apparatus is stopped.

2. The conveying apparatus according to claim 1, wherein the conveying apparatus further comprises a guide rail pre-warning limiting switch and a guide rail position maintaining component; the guide rail pre-warning limiting switch is located on the trolley sliding rail at the near end of the driving station and in front of the guide rail alarming limiting switch; the guide rail position maintaining component is arranged on the outer side of the sliding trolley at the near end of the driving station and used to apply an inward acting force to the sliding trolley or the U-shaped bent rail within certain time when the sliding trolley moves to the outside and triggers the guide rail pre-warning limiting switch, so that the sliding trolley or the U-shaped bent rail does not move to the outside any more; and after the to-be-conveyed object is transmitted to the telescopic guide rail at the far end of the driving station and the sliding trolley moves to the inside away from the guide rail pre-warning limiting switch to make the entire conveying apparatus tensioned to achieve a dynamic balance, the acting force is not applied.

3. The conveying apparatus according to claim 1, comprising two guide rail pre-warning limiting switches and two guide rail position maintaining components, wherein the two guide rail pre-warning limiting switches are respectively located on the two trolley sliding rails, and are both located in front of the guide rail alarming limiting switches on the respective trolley sliding rails and triggered earlier than the guide rail alarming limiting switches on the respective trolley sliding rails; the two guide rail position maintaining components are respectively located on the outer sides of the two sliding trolleys and used to apply an inward acting force to the sliding trolleys or the U-shaped bent rails within certain time when the sliding trolleys on the corresponding sides move to the outside and trigger the guide rail pre-warning limiting switches, so that the sliding trolleys or the U-shaped bent rails do not move to the outside any more; and after the to-be-conveyed object is conveyed away and the sliding trolleys move to the inside away from the guide rail pre-warning limiting switches to tension the entire conveying apparatus to realize a dynamic balance, the acting force is not applied.

4. The conveying apparatus according to claim 2, wherein the guide rail position maintaining components comprise compensation cylinders, in-cylinder position signal switches, cylinder electromagnetic valves and pressure reducing valves; the cylinders are provided with magnetic rings; the magnetic rings are arranged on pistons; the cylinder electromagnetic valves control extended states and retracted states of the cylinders; the in-cylinder position signal switches are magnetic switches; the in-cylinder position signal switches are arranged on the outer sides of the cylinders and used to limit extending limits of piston rods of the compensation cylinders; the piston rods of the compensation cylinders extend out, and then the magnetic rings on the pistons move to the in-cylinder position signal switches to trigger the in-cylinder position signal switches to generate signals to the cylinder electromagnetic valves; the cylinder electromagnetic valves control the cylinders to change from the extended states to the retracted states; air inlets of the cylinder electromagnetic valves are connected with the pressure reducing valves; and compressed air enters the air inlets of the cylinder electromagnetic valves through the pressure reducing valves.

5. The conveying apparatus according to claim 3, wherein the guide rail position maintaining components comprise compensation cylinders, in-cylinder position signal switches, cylinder electromagnetic valves and pressure reducing valves; the cylinders are provided with magnetic rings; the magnetic rings are arranged on pistons; the cylinder electromagnetic valves control extended states and retracted states of the cylinders; the in-cylinder position signal switches are magnetic switches; the in-cylinder position signal switches are arranged on the outer sides of the cylinders and used to limit extending limits of piston rods of the compensation cylinders; the piston rods of the compensation cylinders extend out, and then the magnetic rings on the pistons move to the in-cylinder position signal switches to trigger the in-cylinder position signal switches to generate signals to the cylinder electromagnetic valves; the cylinder electromagnetic valves control the cylinders to change from the extended states to the retracted states; air inlets of the cylinder electromagnetic valves are connected with the pressure reducing valves; and compressed air enters the air inlets of the cylinder electromagnetic valves through the pressure reducing valves.

6. The conveying apparatus according to claim 2, wherein the positions of the guide rail pre-warning limiting switches on the two trolley sliding rails are adjustable.

7. The conveying apparatus according to claim 3, wherein the positions of the guide rail pre-warning limiting switches on the two trolley sliding rails are adjustable.

8. The conveying apparatus according to claim 1, wherein a guide rail bracket is arranged below the telescopic guide rail; the guide rail bracket is used to support the telescopic guide rail and the trolley sliding rails; the U-shaped bottom of each U-shaped bent rail is connected with one counterweight tensioning component; the counterweight tensioning component comprises a counterweight heavy, a counterweight bracket, a steel wire rope and a pulley component; the counterweight bracket comprises a vertical portion and a horizontal portion; the top end of the vertical portion is connected with the horizontal portion; the pulley component comprises two fixed pulleys located at the bottom and the top end of the vertical portion of the counterweight bracket, a fixed pulley located at the end, away from the vertical portion, of the horizontal portion of the counterweight bracket, a fixed pulley fixed in the middle of the U-shaped bottom of the U-shaped bent rail, and a fixed pulley located in the middle of the bottom surface of the end, provided with the U-shaped bent rail, on the guide rail bracket; one end of the steel wire rope is fixed in the middle of the top surface of the end, provided with the U-shaped bent rail, on the guide rail bracket; the steel wire rope bypasses the fixed pulley fixed in the middle of the U-shaped bottom of the U-shaped bent rail, the fixed pulley in the middle of the bottom surface of the end, provided with the U-shaped bent rail, on the guide rail bracket, the two fixed pulleys at the bottom and the top end of the vertical portion of the counterweight bracket and the fixed pulley at the end, away from the vertical portion, of the horizontal portion of the counterweight bracket in sequence; and the other end of the steel wire rope is fixedly connected to the counterweight heavy.

9. The conveying apparatus according to claim 1, wherein a guide rail bracket is arranged below the telescopic guide rail; the guide rail bracket is used to support the telescopic guide rail and the trolley sliding rails; the U-shaped bottom of each U-shaped bent rail is connected with one counterweight tensioning component; the counterweight tensioning component comprises a counterweight heavy, a counterweight bracket, a steel wire rope and a pulley component; the counterweight bracket comprises a vertical portion and a horizontal portion; the top end of the vertical portion is connected with the horizontal portion; the pulley component comprises two fixed pulleys located at the bottom and the top end of the vertical portion of the counterweight bracket, a fixed pulley located at the end, away from the vertical portion, of the horizontal portion of the counterweight bracket, and a fixed pulley located in the middle of the bottom surface of the end, provided with the U-shaped bent rail, on the guide rail bracket; one end of the steel wire rope is fixed at the middle position of the U-shaped bottom of the U-shaped bent rail; the steel wire rope bypasses the fixed pulley in the middle of the bottom surface of the end, provided with the U-shaped bent rail, on the guide rail bracket, the two fixed pulleys at the bottom and the top end of the vertical portion of the counterweight bracket and the fixed pulley at the end, away from the vertical portion, of the horizontal portion of the counterweight bracket in sequence; and the other end of the steel wire rope is fixedly connected to the counterweight heavy.

10. The conveying apparatus according to claim 1, wherein the telescopic guide rail is of a double-layer structure, and the U-shaped bent rails, the fixed sleeve rails and the middle connection rails are all of double-layer structures; a lower layer of telescopic guide rail comprises two side walls and a bottom surface, and the conveying chain is arranged on the bottom surface of the lower layer of telescopic guide rail; and an upper layer of telescopic guide rail comprises two side walls.

11. The conveying apparatus according to claim 10, wherein the sliding bracket comprises a bottom sliding block, a supporting rod, sliding rollers and a top supporting portion; the bottom sliding block is arranged on the conveying chain of the lower layer of telescopic guide rail; the conveying chain may drive the bottom sliding block to move; the lower end of the supporting rod is connected with the bottom sliding block, and the upper end of the supporting rod is connected with the top supporting portion; the top supporting portion is used for placing a to-be-conveyed object; the supporting rod passes through a space between the two side walls of the upper layer of telescopic guide rail; the sliding rollers corresponding to the upper layer of telescopic guide rail are arranged on the supporting rod; and the sliding rollers slide between the two side walls of the upper layer of telescopic guide rail.

\* \* \* \* \*